United States Patent
Brown et al.

(10) Patent No.: US 10,406,608 B2
(45) Date of Patent: Sep. 10, 2019

(54) CUTTING INSERT AND POCKET WITH UNINTERRUPTED AND CONTINUOUS SEATING SURFACE PERIMETER

(71) Applicant: Kennametal Inc., Latrobe, PA (US)

(72) Inventors: Paul Albert Brown, Hostetter, PA (US); Lance David Brunetto, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 67 days.

(21) Appl. No.: 14/599,598

(22) Filed: Jan. 19, 2015

(65) Prior Publication Data
US 2016/0207124 A1 Jul. 21, 2016

(51) Int. Cl.
*B23C 5/20* (2006.01)
*B23C 5/22* (2006.01)

(52) U.S. Cl.
CPC ............ *B23C 5/207* (2013.01); *B23C 5/2221* (2013.01); *B23C 2200/045* (2013.01); *B23C 2200/161* (2013.01); *B23C 2200/168* (2013.01); *B23C 2210/168* (2013.01)

(58) Field of Classification Search
CPC ............ B23C 2200/161; B23C 5/2465; B23C 5/2468; B23C 2200/045; B23C 2200/08; B23C 2200/081; B23C 2200/20
See application file for complete search history.

(56) References Cited

U.S. PATENT DOCUMENTS

| | | | | |
|---|---|---|---|---|
| 5,738,468 A * | 4/1998 | Boianjiu | ............ | B23B 27/1618 407/103 |
| 7,121,771 B2 * | 10/2006 | Englund | ............ | B23B 27/1622 407/103 |
| 7,300,232 B2 * | 11/2007 | Wiman | ................. | B23B 27/145 407/101 |
| 8,573,903 B2 | 11/2013 | Morrison et al. | | |

(Continued)

FOREIGN PATENT DOCUMENTS

| | | | | |
|---|---|---|---|---|
| CN | 101687260 A | | 3/2010 | |
| CN | 101890528 A * | 11/2010 | ............... | B23C 5/06 |

(Continued)

OTHER PUBLICATIONS https://www.merriam-webster.com/dictionary/surface.*

(Continued)

*Primary Examiner* — Willmon Fridie, Jr.
(74) *Attorney, Agent, or Firm* — Matthew S. Bedsole

(57) ABSTRACT

A round cutting insert has a seating surface with a plurality of projections formed on the seating surface proximate a central opening. The projections do not extend to an outer perimeter of the seating surface such that the outer perimeter is continuous and uninterrupted a full 360 degrees. An insert-receiving pocket includes a seating surface with a plurality of dimples for receiving the plurality of projections to prevent rotation of the cutting insert when mounted in the insert-receiving pocket. The plurality of dimples do not extend to an outer perimeter of the seating surface such that the outer perimeter is continuous and uninterrupted a full (Continued)

360 degrees, thereby maximizing contact between the cutting insert and the pocket.

14 Claims, 6 Drawing Sheets

(56) References Cited

U.S. PATENT DOCUMENTS

| | | | | |
|---|---|---|---|---|
| 8,858,130 | B2* | 10/2014 | Morrison | B23C 5/06 407/113 |
| 10,183,333 | B2* | 1/2019 | Hecht | B23B 27/1622 |
| 2007/0011860 | A1* | 1/2007 | Dehn | B21K 25/00 29/525 |
| 2007/0248425 | A1* | 10/2007 | Andersson | B23C 5/06 407/113 |
| 2011/0103905 | A1* | 5/2011 | Morrison | B23C 5/2213 407/48 |
| 2012/0251250 | A1* | 10/2012 | Morrison | B23C 5/2221 407/42 |
| 2013/0279994 | A1* | 10/2013 | Morrison | B23C 5/06 407/64 |
| 2014/0086694 | A1* | 3/2014 | Fang | B23C 5/2221 407/48 |
| 2014/0348600 | A1* | 11/2014 | Matsubara | B23C 5/2221 407/64 |

FOREIGN PATENT DOCUMENTS

| | | | | |
|---|---|---|---|---|
| CN | 203124815 U | | 8/2013 | |
| CN | 103372673 A | | 10/2013 | |
| DE | 19847227 A1 | * | 4/2000 | B23C 5/207 |
| JP | 09234607 A | * | 9/1997 | B23B 27/14 |
| JP | 2007152552 A | * | 6/2007 | B32B 27/16 |
| JP | 2013075337 A | * | 4/2013 | B23C 5/06 |
| JP | 2013146855 A | * | 8/2013 | B23C 5/22 |
| JP | 2013176834 A | * | 9/2013 | B23C 5/20 |
| JP | WO 2014081011 A1 | * | 5/2014 | B22F 7/06 |
| WO | WO 2013051703 A1 | * | 4/2013 | B23C 5/06 |

OTHER PUBLICATIONS https://en.oxforddictionaries.com/definition/surface.*
http://dictionary.cambridge.org/dictionary/english/surface.*
http://www.macmillandictionary.com/us/dictionary/american/surface_1.*
Sep. 4, 2018 Office Action (non-US).
Apr. 16, 2019 Foreign OA.

* cited by examiner

CUTTING INSERT AND POCKET WITH UNINTERRUPTED AND CONTINUOUS SEATING SURFACE PERIMETER

BACKGROUND OF THE INVENTION

The invention relates generally to cutting inserts and, more particularly, relates to round cutting inserts having a seating surface that provides maximum contact between the round cutting insert and the insert-receiving pocket when mounted onto the body of a cutting tool.

The inserts used in tools such as, for example, milling cutters are mounted in complementarily-shaped pockets spaced around the periphery of the tool body. The inserts are typically secured within their respective pockets by clamping screws inserted through a hole provided in the center of the insert. During a cutting operation, such inserts often experience not only compressive and vibratory forces, but some amount of torque due to the angle between the cutting edges of the inserts and the workpiece. For cutting inserts of non-round shapes, such torque does not result in the rotation of the insert due to the interference-type fit between the angled sidewalls of such inserts and the complementarily-shaped walls of the pocket that receive them.

By contrast, round inserts can rotate within their respective pockets because no such mechanical interference naturally arises between the cylindrical or frustoconical sidewalls of round inserts and the corresponding circular walls of the pockets which receive them. The resulting rotation can loosen the clamping screw that secures the insert within its respective pocket. If the clamping screw should become sufficiently loosened, it can vibrate within the surrounding pocket severely enough to become chipped or cracked not only ruining the insert, but also jeopardizing the quality of the cut on the workpiece.

In addition, relatively large round inserts are exposed to higher cutting forces than smaller round inserts. As a result, large round cutting inserts have a tendency to move in a vertical direction (i.e. move up and down about the central axis of the insert) within the insert-receiving pocket during a cutting operation.

SUMMARY OF THE INVENTION

What is needed is an effective feature for relatively large round cutting inserts that effectively supports such inserts and prevents such inserts from moving in a vertical direction when mounted in the insert-receiving pocket. Therefore, the present invention has been developed in view of the foregoing.

In one aspect of the invention, a round cutting insert comprises an outer surface that terminates outwardly in a cutting edge and terminates inwardly in an inner edge, and a seating surface extending radially outward from a central opening to an outer perimeter. A plurality of projections are formed on the seating surface, wherein the plurality of projections do not extend into the outer perimeter of the seating surface such that the outer perimeter of the seating surface is uninterrupted and continuous a full 360 degrees.

In another aspect of the invention, a cutting tool assembly comprises a tool body including a plurality of insert-receiving pockets. Each insert-receiving pocket includes a sidewall and a seating surface extending radially outward from a central opening. Each insert-receiving pocket further includes a seating surface extending radially outward to an outer perimeter, and a plurality of dimples formed in the insert-receiving pocket. A round cutting insert is mounted in a respective insert-receiving pocket. Each round cutting insert including an outer surface that terminates outwardly in a cutting edge and terminates inwardly in an inner edge, and a seating surface extending radially outward from a central opening to an outer perimeter. A plurality of projections are formed on the seating surface. The plurality of dimples do not extend into the outer perimeter of the seating surface such that the outer perimeter of the seating surface is uninterrupted and continuous a full 360 degrees, and the plurality of projections do not extend into the outer perimeter of the seating surface such that the outer perimeter of the seating surface is uninterrupted and continuous a full 360 degrees, thereby providing maximum contact between the seating surface of the cutting insert and the seating surface of the insert-receiving pocket when the cutting insert is mounted in the insert-receiving pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
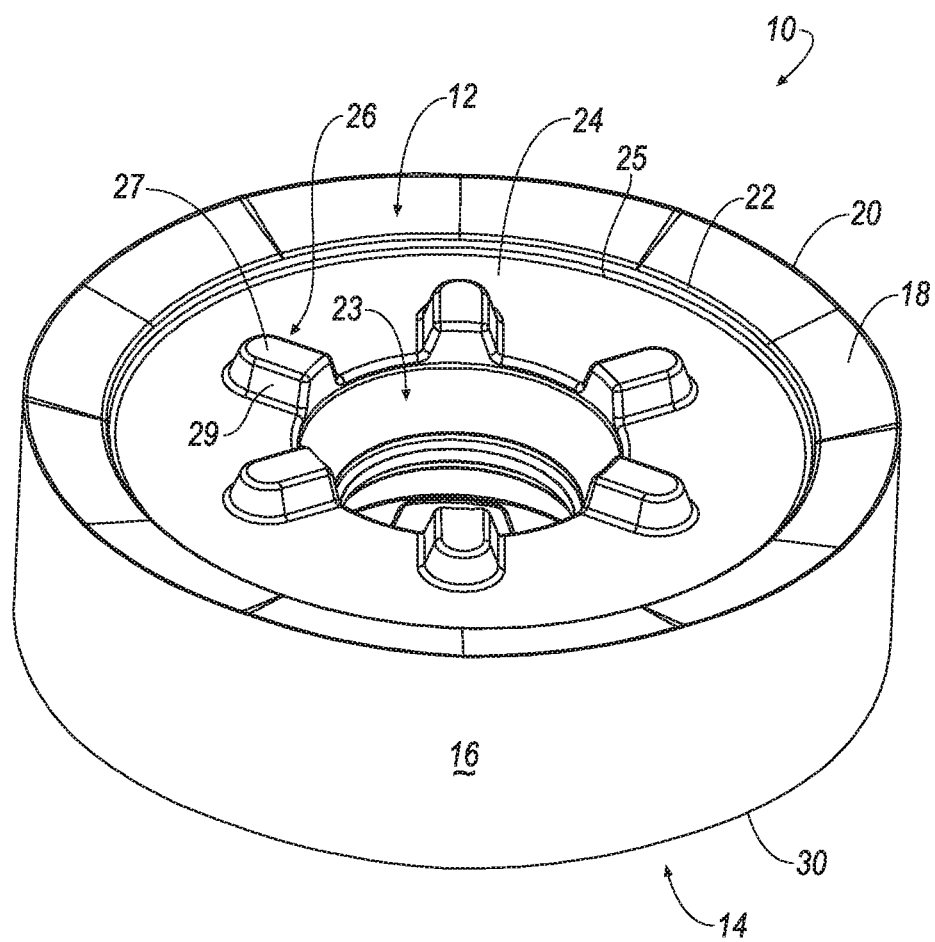
FIG. 1 is a perspective view of a cutting insert according to an aspect of the invention.
Figure 2:
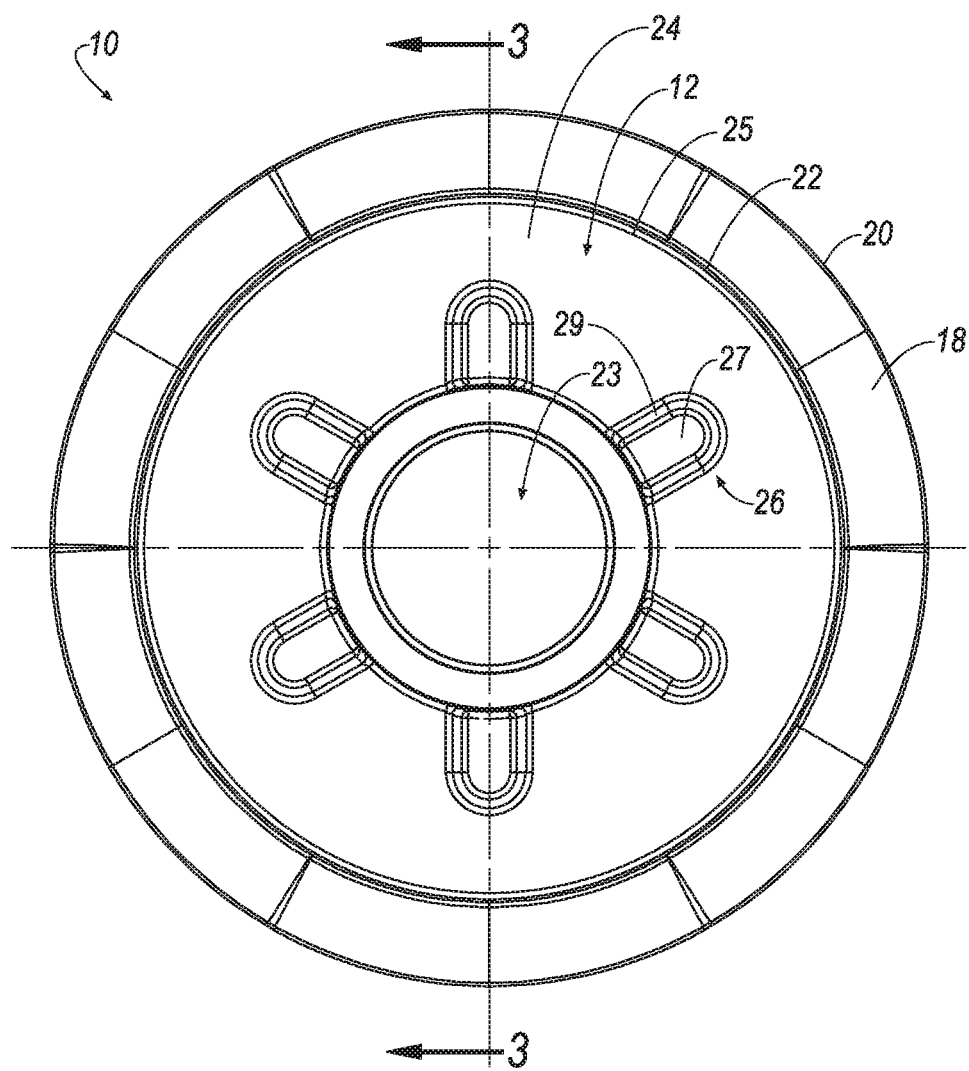
FIG. 2 is a top view of the cutting insert illustrated in FIG. 1.
Figure 3:
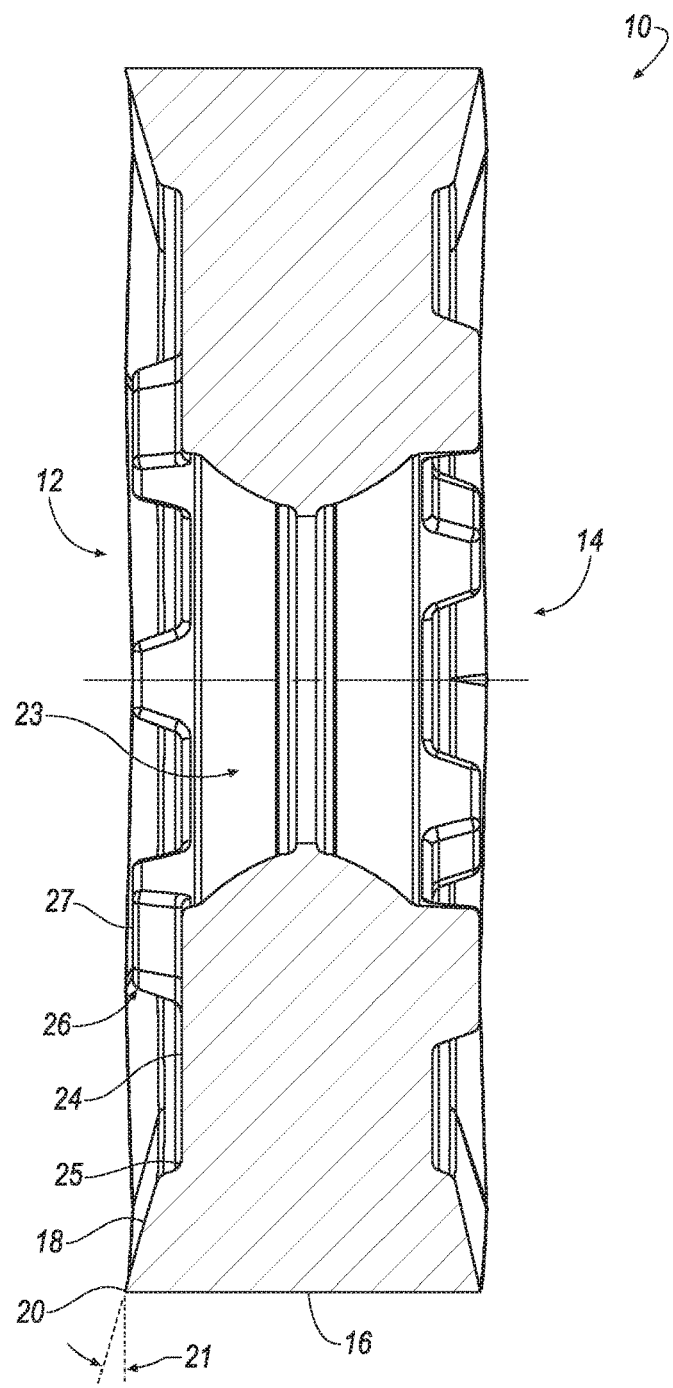
FIG. 3 is a cross-sectional view of the cutting insert taken along line 3-3 of FIG. 2.

Referring to FIGS. 1-3, there is illustrated a cutting insert 10, in accordance with an aspect of the invention. The cutting insert 10 includes a first or top surface 12, a second or bottom surface 14 and a generally circular side portion 16 that extends between the top surface 12 and the bottom surface 14. Thus, it will be appreciated that the cutting insert 10 is a generally round cutting insert for positioning in a tool body for performing a cutting operation on a workpiece (not shown) as will be described in more detail herein. It will also be appreciated that the first or top surface 12 and the second or bottom surface 14 are identical to each other. Thus, only the first or top surface 12 of the cutting insert will be discussed below for brevity.

As shown in FIGS. 1-3, the top surface 12 of the cutting insert 10 includes an outer surface 18 that terminates in a generally outwardly direction in a cutting edge 20 and terminates in a generally inwardly direction to an inner edge 22. In one aspect, the outer surface 18 is also known as a rake surface and slopes downward from the cutting edge 20 toward the inner edge 22 at a rake angle 21 of between about five (5) degrees and about twenty (20) degrees (FIG. 3). For example, the rake angle 21 can be about ten (10) degrees. The cutting insert 10 also includes a seating surface 24 that extends radially outward from a central opening 23 toward the inner edge 22 to a outer perimeter 25. In the illustrated embodiment, the central opening 23 is in the form of a countersunk bore for mounting the cutting insert 10 to a cutting tool assembly 100 using a mounting screw (not shown).

Still referring to FIGS. 1-3, the cutting insert 10 further includes a plurality of projections 26. In one aspect, the plurality of projections 26 are formed adjacent to the central opening 23. In another aspect, the plurality of projections 26 are formed on the seating surface 24 to create a raised profile projection. In another aspect, the plurality of projections 26 are evenly circumferentially spaced about the seating surface 24. The cutting edge 20 is circumferentially disposed about the plurality of projections 26.

The plurality of projections 26 each include a substantially planar top surface 27 contained in a plane wherein at least a portion of the cutting edge 20 is contained in a different plane. In one embodiment, the top surface 27 is contained in a plane that is lower in elevation than the plane containing at least a portion of the cutting edge 20. Each projection 26 includes a sidewall 29 extending between the top surface 27 and the seating surface 24. It should be noted that the outer surface 18 is contained in one plane and the seating surface 24 is contained in another plane that is non-parallel to the plane containing the outer surface 18. Specifically, the seating surface 24 is contained in a plane that is lower in elevation than the plane containing the outer surface 18.

In one aspect of the invention, the plurality of projections 26 do not extend into the outer perimeter 25 of the seating surface 24 such that the outer perimeter 25 of the seating surface 24 is uninterrupted and continuous. In the illustrated embodiment, the outer perimeter 25 is substantially circular in shape. Thus, the outer perimeter 25 of the seating surface 24 extends entirely around the cutting insert 10 uninterrupted and continuously a full 360 degrees.

It has been discovered that the cutting edge 20, which is located on the outer edge of the cutting insert 10, produces a moment about the mounting screw (not shown), which is located at the center of the cutting insert 10, during a cutting operation. This moment transfers the cutting force to a point directly in-line with the force vector and at the maximum distance from the centrally-located mounting screw. By providing a complete, unbroken "seating zone" a full 360 degrees around the circular outer perimeter 25 of the seating surface 24 of the cutting insert 10 (and also around the circular outer perimeter 114 of the seating surface 110 of the pocket 104), the seating contact area is maximized at the outer perimeter 114 of the pocket 104, which reduces the total cutting pressure experienced by the toolholder assembly 100. Because torque is dependent on the force and the distance from the center of rotation to where the force is applied, increasing the distance to the center of rotation (the moment arm) decreases the force required to counteract the torque. Thus, increasing the contact area at the outer perimeter 114 of the seating surface 110 decreases the overall pressure applied to the pocket floor. As a result, the seating surface 24 provides superior seating capability of the cutting insert 10 when mounted in the pocket of the cutting tool assembly, as compared to conventional cutting inserts in which the outer perimeter 25 of the seating surface 24 does not extend in an uninterrupted and continuous fashion a full 360 degrees around the perimeter of the seating surface of the cutting insert.

In the illustrated embodiment, the cutting insert 10 includes a total of six (6) projections 26 that are evenly circumferentially spaced about the seating surface 24. However, it will be appreciated that the invention is not limited by the number of projections 26, and that the invention can be practiced with any desirable number of projections 26, so long as the cutting insert 10 is adequately secured with the pocket of the cutting tool assembly.

Figure 4:
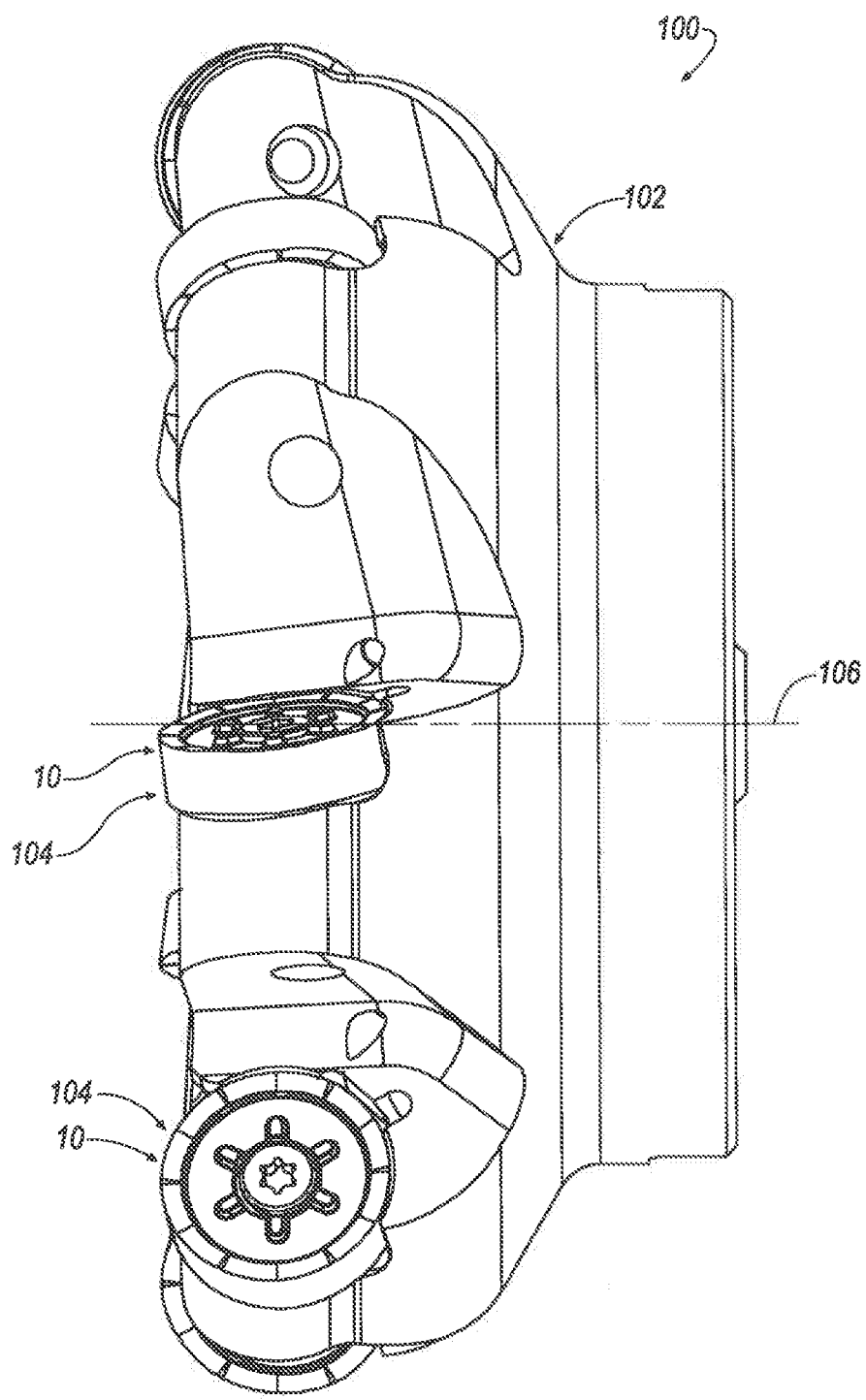
FIG. 4 is an elevational view of a cutting tool assembly according to an aspect of the invention.
Figure 5:
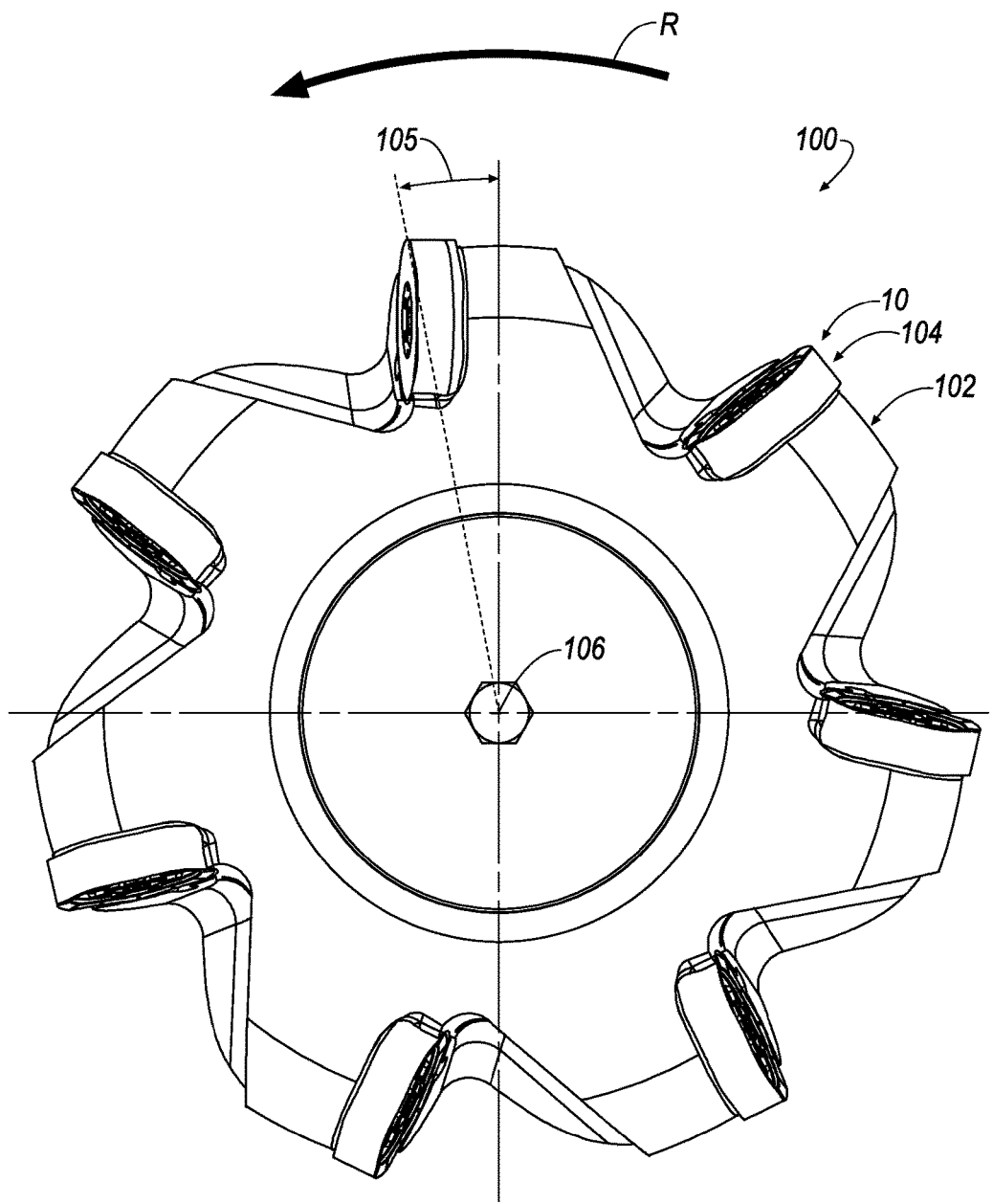
FIG. 5 is a top view of the cutting tool assembly of FIG. 4.
Figure 6:
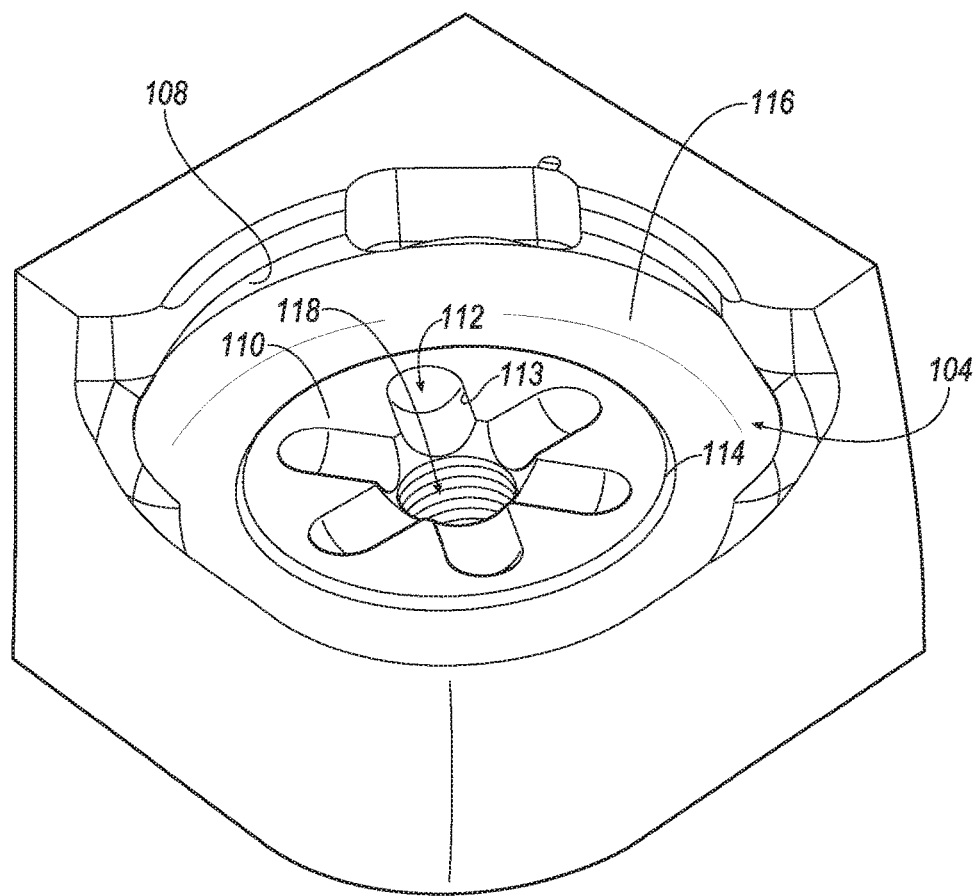
FIG. 6 is a partial, exploded view of an insert-receiving pocket of the cutting tool assembly of FIG. 4.

Referring to FIGS. 4-6, a cutting tool assembly 100 is shown according to an embodiment of the invention. The cutting tool assembly 100 includes a tool body 102 with a plurality of insert-receiving pockets 104 for removably mounting a plurality of the cutting inserts 10 to the tool body 102. As shown in FIG. 5, each cutting insert 10 is mounted in a respective insert-receiving pocket 104 at a positive lead angle 105 of between about five (5) degrees and about fifteen (15) degrees. In one specific embodiment, the lead angle 105 is about eleven (11) degrees. The tool body 102 rotates about a central axis 106 in a direction, R, when attached to a tool spindle (not shown).

As shown in FIG. 6, each insert-receiving pocket 104 includes a sidewall 108 and a seating surface 110 extending radially outward from a central opening 118. The central opening 118 is capable of receiving a mounting screw (not shown) for mounting the cutting insert 10 in the insert-receiving pocket 104. The generally circular side surface 16 of the cutting inserts 10 are received in the insert-receiving pocket 104 adjacent to sidewall 108. In addition, the top surface 12 and the bottom surface 14 of the cutting inserts 10 are received and supported on the seating surface 110 of the insert-receiving pocket 104. In addition, the seating surface 110 includes a plurality of dimples 112 for cooperating with and receiving a corresponding projection 26 of the cutting insert 10. Similar to the projections 26 of the cutting insert 10, the plurality of dimples 112 are located adjacent the central opening 118.

Further, each dimple 112 includes a sidewall 113 for cooperating with the sidewall 29 of each projection 26. Thus, each dimple 112 is complimentary in shape to each projection 26 such that each projection 26 is firmly seated within each dimple 112 when the cutting insert 10 is mounted within the insert-receiving pocket 104 and preventing the cutting insert 10 from being able to rotate within the insert-receiving pocket 104, thereby providing an anti-rotation feature of the invention.

It will be appreciated that if the plurality of projections 26 formed on the top surface 12 are received in the plurality of dimples 112, then the cutting edge 20 is positioned to perform a cutting operation. Similarly, if the plurality of projections 26 formed on the bottom surface 14 are received in the plurality of dimples 112, then a cutting edge 30 (FIG. 1) is positioned for performing a cutting operation. It will be appreciated that the projections 26 on the first surface 12 are generally opposed to the projections 26 on the second surface 14 in order to allow for a user to accurately position the projections 26 within the dimples 112. For example, once a portion of either the first cutting edge 20 or the second cutting edge 30 has been used, then the cutting insert 10 can be lifted such that the projections 26 are no longer seated in the plurality of dimples 112, and then the cutting insert 10 can be indexed by turning or rotating the cutting insert 10 until the projections 26 are reinserted into the plurality of dimples 112. Accordingly, it will be appreciated that the cutting insert 10 is indexable and reversible (double-sided), thereby providing for a longer life of operation for the cutting insert 10.

Still referring to FIG. 6, one aspect of the invention is that the plurality of dimples 112 do not extend into an outer perimeter 114 of the seating surface 110. As a result, the outer perimeter 114 of the seating surface 110 of the pocket 104 extends a full 360 degrees in an uninterrupted and continuous fashion. The diameter of the outer perimeter 114 of the insert-receiving pocket 104 is slightly smaller than the diameter of the outer perimeter 25 of the seating surface 24 of the cutting insert 10. As a result, that the outer perimeter 25 of the cutting insert 10 snugly fits about the outer perimeter 114 of the insert-receiving pocket 104, thereby providing superior support for the cutting insert 10, particularly for relatively large round cutting inserts.

Each insert-receiving pocket 104 further includes a central opening 118 capable of receiving the mounting screw (not shown) for removably securing the insert 10 to the tool body 102 and, more particularly, for removably securing the cutting insert 10 to the insert-receiving pocket 104 of the tool body 102. In the illustrated embodiment, the dimples 112 are adjacent the central opening 118, similar to the projections 26 adjacent to the opening 23 of the cutting insert 10. It will be appreciated that the plurality of first projections 26 on the top surface 12 and the bottom surface 14 of the cutting insert 10 allow a user to easily identify how much the cutting insert 10 is rotated during the indexing of the cutting insert 10.

As described above, the cutting insert 10 of the invention includes a seating surface 24 with a plurality of projections 26 that do not extend to the outer perimeter 25 of the seating surface 24. Likewise, the insert-receiving pocket 104 includes a plurality of dimples 112 that do not extend to the outer perimeter 114 of the seating surface 114. As a result, the outer perimeters 25, 114 are uninterrupted and continuous for the full 360 degrees at the perimeters 25, 114 of the cutting insert 10 and the insert-receiving pocket 104, respectively, thereby maximizing contact between the cutting insert 10 and the insert-receiving pocket 104 and providing superior support for the cutting insert 10 when mounted in the insert-receiving pocket 104.

In addition, the cutting insert 10 includes a plurality of projections 26 extending upward from the seating surface 24 and the insert-receiving pocket 104 includes a corresponding number of dimples 112 extending downward from the seating surface 110 for receiving the projections 26, thereby providing an anti-rotation feature when the cutting insert 10 is mounted in the insert-receiving pocket 104.

As described above, the perimeters 25, 114 of the seating surfaces 24, 110, respectively, are circular in shape. However, it will be appreciated that the invention is not limited by the shape of the perimeters 25, 114 of the seating surfaces 24, 110, and that the invention can be practiced with seating surfaces with any desirable shape so long as the contact at the perimeters 25, 114 of the seating surface 24 of the cutting insert 10 and the seating surface 110 of the pocket 104 is maximized. For example, the perimeters 25, 114 can be polygonal in shape, such as a square, a rectangular, and the like, so long as the perimeters 25, 114 are uninterrupted and continuous a full 360 degrees to maximize the contact at the perimeters 25, 114 of the seating surfaces 24, 110 of the cutting insert 10 and the pocket 104.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A round cutting insert comprising:
a first surface comprising:
   a generally planar seating surface extending radially outward from a central opening to an outer perimeter of the seating surface;
   a plurality of raised profile projections formed on the generally planar seating surface, wherein the plurality of projections do not extend to the outer perimeter of the generally planar seating surface, thereby defining a region of the generally planar seating surface which is uninterrupted and continuous to a full 360 degrees; and
   an outer surface which extends radially outward from the outer perimeter of the generally planar seating surface, the outer surface being defined by an inner edge and a cutting edge disposed radially outward of the inner edge; and
a second surface opposite the first surface, the second surface comprising a cutting edge,
wherein the generally planar seating surface on the first surface is structured to engage a corresponding surface of an insert seat of a tool body when placed into the insert seat.

2. The round cutting insert of claim 1, wherein the plurality of projections are formed on the generally planar seating surface adjacent to the central opening of the cutting insert.

3. The round cutting insert of claim 2, wherein the plurality of projections each include a top surface contained in a plane that is different with respect to a plane that contains the cutting edge.

4. The round cutting insert of claim 2, wherein the plurality of projections are evenly circumferentially spaced about the generally planar seating surface.

5. The round cutting insert of claim 1, wherein the cutting insert is indexable and reversible.

6. The round cutting insert of claim 1, wherein the outer surface slopes downward from the cutting edge toward the inner edge at a rake angle of between five degrees and twenty degrees.

7. The round cutting insert of claim 1, wherein the outer surface is contained in a plane and the generally planar seating surface is contained in another plane that is non-parallel to the plane containing the outer surface.

8. The round cutting insert of claim 1, wherein the generally planar seating surface is circular.

9. A cutting tool assembly, comprising:
a tool body including a plurality of insert-receiving pockets, each insert-receiving pocket including a sidewall and a pocket seating surface extending radially outward from a central opening of the insert-receiving pocket to an outer perimeter of the pocket seating surface, and a plurality of dimples formed in the insert-receiving pocket; and
a round cutting insert mounted in a respective insert-receiving pocket, each round cutting insert including an outer surface that terminates outwardly in a cutting edge and terminates inwardly in an inner edge; and a generally planar insert seating surface extending radially outward from a central opening of the round cutting insert to an outer perimeter of the round cutting insert, and a plurality of projections formed on the generally planar insert seating surface,
wherein the plurality of dimples do not extend to the outer perimeter of the pocket seating surface such that the outer perimeter of the pocket seating surface is uninterrupted and continuous a full 360 degrees,
wherein the plurality of projections do not extend into the outer perimeter of the generally planar insert seating surface such that the outer perimeter of the generally planar insert seating surface defines a seating face which is uninterrupted and continuous a full 360 degrees, thereby providing maximum contact between the seating face of the insert seating surface and the pocket seating surface when the cutting insert is mounted in the insert receiving pocket; and wherein, when the cutting insert is mounted in the insert receiving pocket, the seating face of the insert seating surface extending radially outward from a central opening of the round cutting insert to an outer perimeter of the round cutting insert is in direct contact with the pocket seating surface extending radially outward from a central opening of the insert-receiving pocket to an outer perimeter of the pocket seating surface.

10. The cutting tool assembly of claim 9, wherein the plurality of projections formed on the generally planar insert seating surface are adjacent to the central opening of the cutting insert, and wherein the plurality of dimples formed in the pocket seating surface are adjacent to the central opening of the insert-receiving pocket.

11. The cutting tool assembly of claim 9, wherein the plurality of projections each include a top surface contained in a plane that is different with respect to a plane that contains the cutting edge.

12. The cutting tool assembly of claim 9, wherein the plurality of projections are evenly circumferentially spaced about the generally planar insert seating surface.

13. The cutting tool assembly of claim 9, wherein the cutting insert is indexable and reversible.

14. The cutting tool assembly of claim 9, wherein the outer perimeter of the generally planar insert seating surface is circular, and wherein the outer perimeter of the pocket seating surface is circular.

\* \* \* \* \*